(12) United States Patent
Kennedy et al.

(10) Patent No.: US 8,569,420 B2
(45) Date of Patent: Oct. 29, 2013

(54) SINGLY-TERMINATED POLYISOBUTYLENES AND PROCESS FOR MAKING SAME

(75) Inventors: Joseph P. Kennedy, Akron, OH (US); Subramanyam Ummadisetty, Hattiesburg, MS (US)

(73) Assignee: The University of Akron, Akron, OH (US)

( * ) Notice: Subject to any disclaimer, the term of this patent is extended or adjusted under 35 U.S.C. 154(b) by 466 days.

(21) Appl. No.: 12/665,690

(22) PCT Filed: Jun. 19, 2008

(86) PCT No.: PCT/US2008/007638
§ 371 (c)(1),
(2), (4) Date: Dec. 20, 2010

(87) PCT Pub. No.: WO2008/156806
PCT Pub. Date: Dec. 24, 2008

(65) Prior Publication Data
US 2011/0082259 A1  Apr. 7, 2011

Related U.S. Application Data

(60) Provisional application No. 60/936,250, filed on Jun. 19, 2007.

(51) Int. Cl.
*C08F 4/00* (2006.01)
*C08F 136/20* (2006.01)

(52) U.S. Cl.
USPC ....................................... 525/244; 525/332.3

(58) Field of Classification Search
USPC .............. 525/379, 384, 386, 263, 224, 332.3; 526/348.7
See application file for complete search history.

(56) References Cited

U.S. PATENT DOCUMENTS

| 4,524,188 A | 6/1985 | Kennedy et al. |
| 5,362,817 A | 11/1994 | Osman |
| 5,442,015 A | 8/1995 | Kennedy |
| 5,849,830 A | 12/1998 | Tsipursky |
| 6,620,898 B2 | 9/2003 | Webb et al. |
| 2006/0079641 A1 | 4/2006 | Fulkada |
| 2006/0106173 A1* | 5/2006 | Karl et al. ................ 525/263 |

FOREIGN PATENT DOCUMENTS

| EP | 1225186 A1 | 7/2002 |
| EP | 2099831 A1 | 9/2009 |
| WO | 9802468 A1 | 1/1998 |

OTHER PUBLICATIONS

Bela Ivan and Joseph P. Kennedy, "Living Carbocationic Polymerization. XXX. One-Pot Synthesis of Allyl-Terminated Linear and Tri-arm Star Polyisobutylenes, and Epoxy- and Hydroxy-Telechelics Therefrom", Journal of Polymer Science, Part A: Polymer Chemistry, vol. 28, pp. 89 through 104, 1990.

Li, J, et al., "Polyisobutylene Supports—a Non-Polar Hydrocarbon Analog of PEG Supports", Tetrahedron, Elsevier Science Publishers, Amsterdam, NL, vol. 61, No. 51, pp. 12081-12092, Jul. 9, 2005.

* cited by examiner

*Primary Examiner* — Ling Choi
*Assistant Examiner* — Monique Peets
(74) *Attorney, Agent, or Firm* — Renner Kenner Greive Bobak Taylor & Weber

(57) ABSTRACT

The present invention generally relates to singly-terminated polyisobutylene (PIB) compounds, and to a process for making such compounds. In one embodiment, the present invention relates to singly-terminated polyisobutylene compounds that contain only one primary alcohol, amine, or methacrylate group as the single-terminating group. In another embodiment, the present invention relates to singly-terminated polyisobutylenes carrying exactly one terminal alcohol, amine, or methacrylate group, where such singly-terminated polyisobutylenes have a number average molecular weight of about 500 to about 5000 grams per mole. In still another embodiment, the present invention relates to singly-terminated polyisobutylene compounds that can be used to synthesize polyurethanes, to polyurethane compounds made via the use of such polyisobutylene compounds, and to processes for making such compounds.

4 Claims, 10 Drawing Sheets

SINGLY-TERMINATED POLYISOBUTYLENES AND PROCESS FOR MAKING SAME

FIELD OF THE INVENTION

The present invention generally relates to singly-terminated polyisobutylene (PIB) compounds, and to a process for making such compounds. In one embodiment, the present invention relates to singly-terminated polyisobutylene compounds that contain only one primary alcohol, amine, or methacrylate group as the single-terminating group. In another embodiment, the present invention relates to singly-terminated polyisobutylenes carrying exactly one terminal alcohol, amine, or methacrylate group, where such singly-terminated polyisobutylenes have a number average molecular weight of about 500 to about 5000 grams per mole. In still another embodiment, the present invention relates to singly-terminated polyisobutylene compounds that can be used to synthesize polyurethanes, to polyurethane compounds made via the use of such polyisobutylene compounds, and to processes for making such compounds.

BACKGROUND OF THE INVENTION

Various methods have been tried to produce singly-terminated polyisobutylenes compounds with various single primary end groups selected from alcohol, amine, or methacrylate. However, to date, such methods have been either expensive, produced very low yields, or both.

Given the above, there is a need in the art for a manufacturing process that permits the efficient and cost-effective production/manufacture of singly-terminated polyisobutylene (PIB) compounds, such as PIB-$(CH_2)_3$—OH, PIB-$(CH_2)_3$—$NH_2$, or PIB-$(CH_2)_3$-MA (where MA stands for a methacrylate group).

SUMMARY OF THE INVENTION

The present invention generally relates to singly-terminated polyisobutylene (PIB) compounds, and to a process for making such compounds. In one embodiment, the present invention relates to singly-terminated polyisobutylene compounds that contain only one primary alcohol, amine, or methacrylate group as the single-terminating group. In another embodiment, the present invention relates to singly-terminated polyisobutylenes carrying exactly one terminal alcohol, amine, or methacrylate group, where such singly-terminated polyisobutylenes have a number average molecular weight of about 500 to about 5000 grams per mole. In still another embodiment, the present invention relates to singly-terminated polyisobutylene compounds that can be used to synthesize polyurethanes, to polyurethane compounds made via the use of such polyisobutylene compounds, and to processes for making such compounds.

In one embodiment, the present invention relates to a method for producing a primary alcohol-terminated polyisobutylene compound comprising the steps of: (A) providing an alkenyl-terminated polyisobutylene having at least one alkenyl termini, wherein the one or more alkenyl termini are formed from straight or branched $C_3$ to $C_{12}$ alkenyl groups having a double bond present at the end of the alkenyl group; (B) subjecting the alkenyl-terminated polyisobutylene to a bromination reaction to form a primary bromine-terminated polyisobutylene compound having at least one primary bromine termini; (C) converting the primary bromine-terminated polyisobutylene compound to a primary alcohol-terminated polyisobutylene via a base reaction, the primary alcohol-terminated polyisobutylene having at least one primary alcohol termini; and (D) recovering the primary alcohol-terminated polyisobutylene.

In another embodiment, the present invention relates to a primary alcohol-terminated polyisobutylene compound according to the following formula:

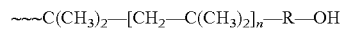

where ~~~ represents the remaining portion of a linear, star, hyperbranched, or arborescent molecule or a methyl group, n is an integer from 2 to about 5,000, and R is a straight or branched $C_3$ to $C_{12}$ linkage formed from a corresponding straight or branched $C_3$ to $C_{12}$ alkenyl group having a double bond present at the end of the alkenyl group, and where the primary alcohol-terminated polyisobutylene has at least one primary alcohol termini.

In still another embodiment, the present invention relates to a method for producing a primary methacrylate-terminated polyisobutylene compound comprising the steps of: (a) providing an alkenyl-terminated polyisobutylene having at least one alkenyl termini, wherein the one or more alkenyl termini are formed from straight or branched $C_3$ to $C_{12}$ alkenyl groups having a double bond present at the end of the alkenyl group; (b) subjecting the alkenyl-terminated polyisobutylene to a bromination reaction to form a primary bromine-terminated polyisobutylene compound having at least one primary bromine termini; (c) converting the primary bromine-terminated polyisobutylene compound to a primary methacrylate-terminated polyisobutylene via a reaction with at least one alkaline methacrylate compound, the primary methacrylate-terminated polyisobutylene having at least one primary methacrylate termini; and (d) recovering the primary methacrylate-terminated polyisobutylene.

In still yet another embodiment, the present invention relates to a primary methacrylate-terminated polyisobutylene compound according to the following formula:

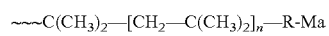

where ~~~represents the remaining portion of a linear, star, hyperbranched, or arborescent molecule or a methyl group, n is an integer from 2 to about 5,000, R is a straight or branched $C_3$ to $C_{12}$ linkage formed from a corresponding straight or branched $C_3$ to $C_{12}$ alkenyl group having a double bond present at the end of the alkenyl group, and Ma represents a methacrylate termini, and where the primary methacrylate-terminated polyisobutylene has at least one primary methacrylate termini.

In still yet another embodiment, the present invention relates to a method for producing a primary amine-terminated polyisobutylene compound comprising the steps of: (i) providing an alkenyl-terminated polyisobutylene having at least one alkenyl termini, wherein the one or more alkenyl termini are formed from straight or branched $C_3$ to $C_{12}$ alkenyl groups having a double bond present at the end of the alkenyl group; (ii) subjecting the alkenyl-terminated polyisobutylene to a bromination reaction to form a primary bromine-terminated polyisobutylene compound having at least one primary bromine termini; (iii) converting the primary bromine-terminated polyisobutylene compound to a primary phthalimide-terminated polyisobutylene via a reaction with at least one alkaline phthalimide compound, the primary phthalimide-terminated polyisobutylene having at least one primary phthalimide termini; (iv) converting the primary phthalimide-terminated polyisobutylene compound to a primary amine-terminated compound via a reaction with an amine hydrate compound, the primary amine-terminated polyisobutylene having at least one primary amine termini; and (v) recovering the primary amine-terminated polyisobutylene.

In still yet another embodiment, the present invention relates to a primary amine-terminated polyisobutylene compound according to the following formula:

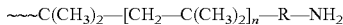

where ~~~ represents the remaining portion of a linear, star, hyperbranched, or arborescent molecule or a methyl group, n is an integer from 2 to about 5,000, and R is a straight or branched $C_3$ to $C_{12}$ linkage formed from a corresponding straight or branched $C_3$ to $C_{12}$ alkenyl group having a double bond present at the end of the alkenyl group, and where the primary amine-terminated polyisobutylene has at least one primary methacrylate termini.

In still yet another embodiment, the present invention relates to a method for producing a primary bromine-terminated polyisobutylene compound comprising the steps of: providing an alkenyl-terminated polyisobutylene having at least one alkenyl termini, wherein the one or more alkenyl termini are formed from straight or branched $C_3$ to $C_{12}$ alkenyl groups having a double bond present at the end of the alkenyl group; subjecting the alkenyl-terminated polyisobutylene to a bromination reaction to form a primary bromine-terminated polyisobutylene compound having at least one primary bromine termini; and recovering the primary bromine-terminated polyisobutylene.

In still yet another embodiment, the present invention relates to a primary bromine-terminated polyisobutylene compound according to the following formula:

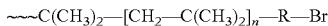

where ~~~ represents the remaining portion of a linear, star, hyperbranched, or arborescent molecule or a methyl group, n is an integer from 2 to about 5,000, and R is a straight or branched $C_3$ to $C_{12}$ linkage formed from a corresponding straight or branched $C_3$ to $C_{12}$ alkenyl group having a double bond present at the end of the alkenyl group, and where the primary bromine-terminated polyisobutylene has at least one primary bromine termini.

In still yet another embodiment, the present invention relates to a method for producing a primary alcohol-terminated polyisobutylene compound comprising the steps of: (A) providing an alkenyl-terminated polyisobutylene having exactly one alkenyl termini, wherein the alkenyl termini is formed from straight or branched $C_3$ to $C_{12}$ alkenyl groups having a double bond present at the end of the alkenyl group; (B) subjecting the alkenyl-terminated polyisobutylene to a bromination reaction to form a primary bromine-terminated polyisobutylene compound having exactly one primary bromine termini; (C) converting the primary bromine-terminated polyisobutylene compound to a primary alcohol-terminated polyisobutylene via a base reaction, the primary alcohol-terminated polyisobutylene having exactly one primary alcohol termini; and (D) recovering the primary alcohol-terminated polyisobutylene.

In still yet another embodiment, the present invention relates to a primary alcohol-terminated polyisobutylene compound according to the following formula:

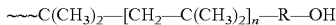

where ~~~ represents the remaining portion of a linear, star, hyperbranched, or arborescent molecule or a methyl group, n is an integer from 2 to about 5,000, and R is a straight or branched $C_3$ to $C_{12}$ linkage formed from a corresponding straight or branched $C_3$ to $C_{12}$ alkenyl group having a double bond present at the end of the alkenyl group, and where the primary alcohol-terminated polyisobutylene has exactly one primary alcohol termini.

In still yet another embodiment, the present invention relates to a method for producing a primary methacrylate-terminated polyisobutylene compound comprising the steps of: (a) providing an alkenyl-terminated polyisobutylene having exactly one alkenyl termini, wherein the alkenyl termini is formed from straight or branched $C_3$ to $C_{12}$ alkenyl groups having a double bond present at the end of the alkenyl group; (b) subjecting the alkenyl-terminated polyisobutylene to a bromination reaction to form a primary bromine-terminated polyisobutylene compound having exactly one primary bromine termini; (c) converting the primary bromine-terminated polyisobutylene compound to a primary methacrylate-terminated polyisobutylene via a reaction with at least one alkaline methacrylate compound, the primary methacrylate-terminated polyisobutylene having exactly one primary methacrylate termini; and (d) recovering the primary methacrylate-terminated polyisobutylene.

In still yet another embodiment, the present invention relates to a primary methacrylate-terminated polyisobutylene compound according to the following formula:

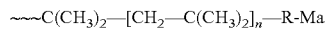

where ~~~ represents the remaining portion of a linear, star, hyperbranched, or arborescent molecule or a methyl group, n is an integer from 2 to about 5,000, R is a straight or branched $C_3$ to $C_{12}$ linkage formed from a corresponding straight or branched $C_3$ to $C_{12}$ alkenyl group having a double bond present at the end of the alkenyl group, and Ma represents a methacrylate termini, and where the primary methacrylate-terminated polyisobutylene has exactly one primary methacrylate termini.

In still yet another embodiment, the present invention relates to a method for producing a primary amine-terminated polyisobutylene compound comprising the steps of: (i) providing an alkenyl-terminated polyisobutylene having exactly one alkenyl termini, wherein the alkenyl termini is formed from straight or branched $C_3$ to $C_{12}$ alkenyl groups having a double bond present at the end of the alkenyl group; (ii) subjecting the alkenyl-terminated polyisobutylene to a bromination reaction to form a primary bromine-terminated polyisobutylene compound having exactly one primary bromine termini; (iii) converting the primary bromine-terminated polyisobutylene compound to a primary phthalimide-terminated polyisobutylene via a reaction with at least one alkaline phthalimide compound, the primary phthalimide-terminated polyisobutylene having exactly one primary phthalimide termini; (iv) converting the primary phthalimide-terminated polyisobutylene compound to a primary amine-terminated compound via a reaction with an amine hydrate compound, the primary amine-terminated polyisobutylene having exactly one primary amine termini; and (v) recovering the primary amine-terminated polyisobutylene.

In still yet another embodiment, the present invention relates to a primary amine-terminated polyisobutylene compound according to the following formula:

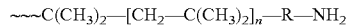

where ~~~ represents the remaining portion of a linear, star, hyperbranched, or arborescent molecule or a methyl group, n is an integer from 2 to about 5,000, and R is a straight or branched $C_3$ to $C_{12}$ linkage formed from a corresponding straight or branched $C_3$ to $C_{12}$ alkenyl group having a double bond present at the end of the alkenyl group, and where the primary amine-terminated polyisobutylene has exactly one primary methacrylate termini.

In still yet another embodiment, the present invention relates to a method for producing a primary bromine-terminated polyisobutylene compound comprising the steps of: providing an alkenyl-terminated polyisobutylene having exactly one alkenyl termini, wherein the alkenyl termini is formed from straight or branched $C_3$ to $C_{12}$ alkenyl groups having a double bond present at the end of the alkenyl group; subjecting the alkenyl-terminated polyisobutylene to a bromination reaction to form a primary bromine-terminated polyisobutylene compound having exactly one primary bromine termini; and recovering the primary bromine-terminated polyisobutylene.

In still yet another embodiment, the present invention relates to a primary bromine-terminated polyisobutylene compound according to the following formula:

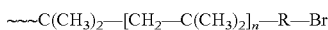

~~~$C(CH_3)_2$—$[CH_2$—$C(CH_3)_2]_n$—R—Br where ~~~ represents the remaining portion of a linear, star, hyperbranched, or arborescent molecule or a methyl group, n is an integer from 2 to about 5,000, and R is a straight or branched $C_3$ to $C_{12}$ linkage formed from a corresponding straight or branched $C_3$ to $C_{12}$ alkenyl group having a double bond present at the end of the alkenyl group, and where the primary bromine-terminated polyisobutylene has exactly one primary bromine termini.

In still yet another embodiment, the present invention relates to a one pot method for producing a primary alcohol-terminated, methacrylate-terminated, or amine-terminated polyisobutylene compound comprising the steps of: providing a one port reaction vessel containing a reaction mixture designed to yield a primary alcohol-terminated, methacrylate-terminated, or amine-terminated polyisobutylene compound, the reaction mixture comprising: at least one polyisobutylene precursor or monomer; a polymerization mixture designed to polymerize the at least one polyisobutylene precursor or monomer; at least one bromine containing compound; and one of the following compounds designed to yield a primary alcohol-terminated, methacrylate-terminated, or amine-terminated polyisobutylene compound: (a) a base mixture designed to yield a primary alcohol-terminated polyisobutylene compound; (b) an alkaline methacrylate mixture designed to yield a primary methacrylate-terminated polyisobutylene compound; or (c) an alkaline phthalimide/amine hydrate mixture designed to yield a primary amine-terminated polyisobutylene compound; and recovering the primary alcohol-terminated, methacrylate-terminated, or amine-terminated polyisobutylene compound from the one pot reaction, wherein the primary alcohol-terminated, methacrylate-terminated, or amine-terminated polyisobutylene compound has at least one primary alcohol, methacrylate or amine termini.

DETAILED DESCRIPTION OF THE INVENTION

Figure 1A:
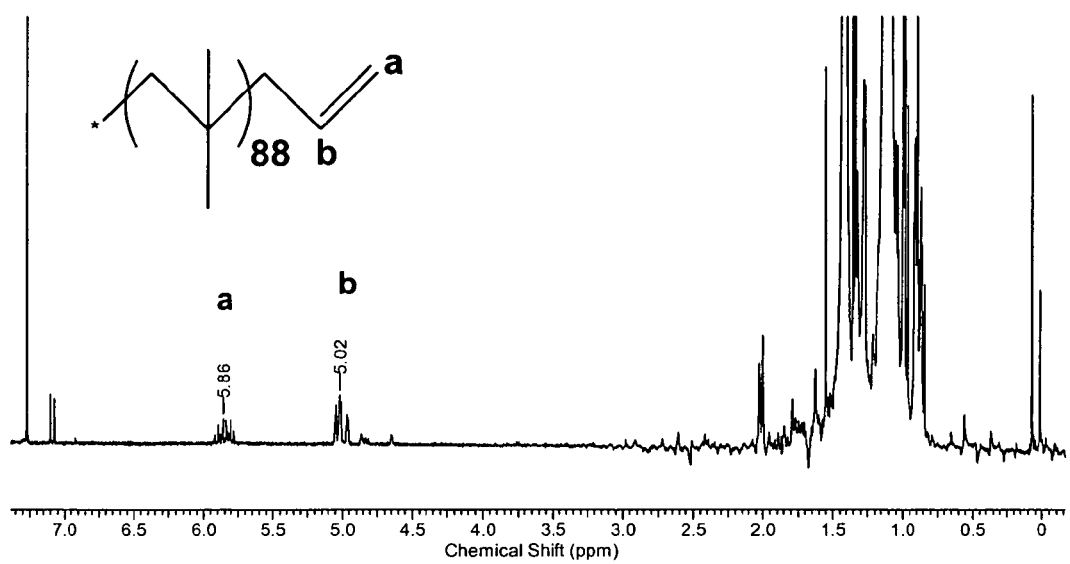
FIG. 1(a) is a $^1$H NMR spectrum of PIB-$CH_2$—$CH$=$CH_2$.

The present invention generally relates to singly-terminated polyisobutylene (PIB) compounds, and to a process for making such compounds. In one embodiment, the present invention relates to singly-terminated polyisobutylene compounds that contain only one primary alcohol, amine, or methacrylate group as the single-terminating group. In another embodiment, the present invention relates to singly-terminated polyisobutylenes carrying exactly one terminal alcohol, amine, or methacrylate group, where such singly-terminated polyisobutylenes have a number average molecular weight of about 500 to about 5000 grams per mole. In still another embodiment, the present invention relates to singly-terminated polyisobutylene compounds that can be used to synthesize polyurethanes, to polyurethane compounds made via the use of such polyisobutylene compounds, and to processes for making such compounds.

In one embodiment, the present invention relates to singly-terminated polyisobutylenes carrying exactly one terminal alcohol, amine, or methacrylate group, where such singly-terminated polyisobutylenes have a number average molecular weight of about 100 to about 25,000 grams per mole, or from about 200 to about 20,000 grams per mole, or from about 300 to about 15,000 grams per mole, or from about 400 to about 10,000 grams per mole, or even from about 500 to about 5000 grams per mole. Here, as well as elsewhere in the specification and claims, individual range limits can be combined to form alternative non-disclosed ranges.

In another embodiment, the present invention contains a PIB portion that contains from 2 to about 5,000, or from about 7 to about 4,500, or from about 10 to about 4,000, or from about 15 to about 3,500, or from about 25 to about 3,000, or from about 75 to about 2,500, or from about 100 to about 2,000, or from about 250 to about 1,500, or even from about 500 to about 1,000 repeating polymer units in the PIB portion of the molecule. Here, as well as elsewhere in the specification and claims, individual range limits can be combined to form alternative non-disclosed ranges.

In one embodiment, the present invention relates to a method for producing various PIB molecules-terminated with one —$CH_2$—$CH_2$—$CH_2$—X group, where X is selected from an alcohol, amine, methacrylate, or a hydrocarbon substituent group that contains only one primary alcohol, amine, or methacrylate.

In another embodiment, the present invention relates to a method for producing various PIB molecules-terminated with one —$CH_2$—$CH_2$—$CH_2$—X group, where X is a hydrocarbon substituent group that contains only one primary alcohol. In this embodiment, the hydrocarbon substituent groups that can be used as a terminating group includes, but is not limited to, any straight or branched chain substituent group having only one primary alcohol, where such groups have from 1 to about 12 carbon atoms, or from 1 to about 10 carbon atoms, or from 1 to about 8, or from about 1 to about 6 carbon atoms, or even from about 2 to about 5 carbon atoms. Here, as well as elsewhere in the specification and claims, individual range limits can be combined to form alternative non-disclosed ranges.

In another embodiment, the present invention relates to a method for producing various PIB molecules-terminated with one —CH$_2$—CH$_2$—CH$_2$—X group, where X is a hydrocarbon substituent group that contains only one primary amine. In this embodiment, the hydrocarbon substituent groups that can be used as a terminating group includes, but is not limited to, any straight or branched chain substituent group having only one primary amine, where such groups have from 1 to about 12 carbon atoms, or from 1 to about 10 carbon atoms, or from 1 to about 8, or from about 1 to about 6 carbon atoms, or even from about 2 to about 5 carbon atoms. Here, as well as elsewhere in the specification and claims, individual range limits can be combined to form alternative non-disclosed ranges.

In another embodiment, the present invention relates to a method for producing various PIB molecules-terminated with one —CH$_2$—CH$_2$—CH$_2$—X group, where X is a hydrocarbon substituent group that contains only one primary methacrylate. In this embodiment, the hydrocarbon substituent groups that can be used as a terminating group includes, but is not limited to, any straight or branched chain substituent group having only one primary methacrylate, where such groups have from 1 to about 12 carbon atoms, or from 1 to about 10 carbon atoms, or from 1 to about 8, or from about 1 to about 6 carbon atoms, or even from about 2 to about 5 carbon atoms. Here, as well as elsewhere in the specification and claims, individual range limits can be combined to form alternative non-disclosed ranges.

It should be noted that the present invention is not limited to solely the use of allyl-terminated compounds as shown herein. Instead, other straight or branched C$_3$ to C$_{12}$, C$_4$ to C$_{10}$, or even C$_5$ to C$_7$ alkenyl groups can be used so long as one double bond in such alkenyl groups is present at the end of the chain. Here, as well as elsewhere in the specification and claims, individual range limits can be combined to form alternative non-disclosed range limits.

As a further example regarding the above-mentioned alkenyl groups the following general formula is used to show the positioning of the end double bond:

where R$_1$ is the remaining portion of the straight or branched alkenyl groups described above. In another embodiment, the alkenyl groups of the present invention contain only one double bond and this double bond is at the end of the chain as described above.

In one embodiment, the present invention relates to linear, or star-shaped, or hyperbranched, or arborescent PIB compounds, where such compounds contain only one primary alcohol-terminated, primary amine-terminated, or primary methacrylate-terminated segment. Such molecular geometries are known in the art, and a discussion herein is omitted for the sake of brevity.

The following examples are exemplary in nature and the present invention is not limited thereto. Rather, as is noted above, the present invention relates to the production and/or manufacture of various primary alcohol-terminated, primary amine-terminated, or primary methacrylate-terminated PIB compounds and polyurethane compounds made therefrom.

EXAMPLES

The following example concerns the synthesis of a primary hydroxyl-terminated polyisobutylene. It should be noted that the following examples are for illustrative purposes and that the present invention is not limited thereto.

Materials:

Hydrogen bromide, 18-crown-6, hydrazine hydrate, potassium benzoate, potassium phthalimide, sodium methacrylate, sodium, tetrabutyl ammonium benzoate, and tetrabutyl ammonium hydrogen sulfate are from Aldrich, and used as received. Glissopal® 2300 (BASF), magnesium sulfate (Fisher Scientific), sodium bicarbonate (EMD), potassium hydroxide (J. T. Baker), methanol (EMD), and ethanol (AAPER) are used as received. 1-methyl-2-pyrrolidone (NMP) (Alfa Aesar) is distilled over CaH$_2$ prior to use. Hexanes, n-heptane and toluene (Fisher Scientific) are refluxed over sodium prior to use.

Synthesis of Hydroxyl-Terminated Polyisobutylene (PIB-(CH$_2$)$_3$—OH)

In this example, the synthesis of PIB-(CH$_2$)$_3$—OH involves three steps: (a) the synthesis of allyl-terminated polyisobutylene (b) the hydrobromination of such a PIB-allyl to PIB-(CH$_2$)$_3$—Br; and (c) the substitution of the terminal primary bromine to an —OH.

Synthesis of Allyl Terminated Polyisobutylene (PIB-Allyl)

The synthesis is carried out by following the procedure described in an article by Kennedy et al. (see Ivan, B. and Kennedy, J. P.; *J. Polym. Sci. Part A: Polym. Chem.*, Vol. 28, pp. 89 through 104, 1990). This synthesis is summarized by the reaction scheme shown below.

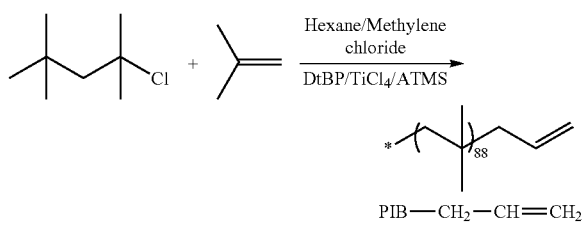

In light of the above, polymerization of isobutylene, and the subsequent allylation thereof, are carried out in a 500 mL round bottom flask equipped with a mechanical stirrer under a dry nitrogen atmosphere in a dry box (H$_2$O<1 ppm) at −78° C. The following reagents are added in sequence: hexanes (150 mL/98 grams), methylene chloride (100 mL/112 grams), isobutylene (48 mL/34 grams), proton trap (di-tert-butyl pyridine—0.47 mL/0.4 grams) and initiator (1-chloro-2,4,4-trimethyl pentane—1.18 mL/1.11 grams). The polymerization is initiated by the addition of a 1.64 mL (2.84 grams) of TiCl$_4$ and the charge is stirred for 20 minutes. The reaction is terminated by the addition of pre-chilled allyl trimethylsilane (3.57 mL/2.57 grams) and is then stirred for 1 hour. Finally, 10 mL of aqueous NaHCO$_3$ is added into the charge and the charge is vigorously stirred. Next, the organic layer is separated, washed three times with distilled water, and dried over MgSO$_4$. The hexanes are then removed by a rotovap and the resulting polymer (32 grams) is dried under vacuum.

Figure 1B:
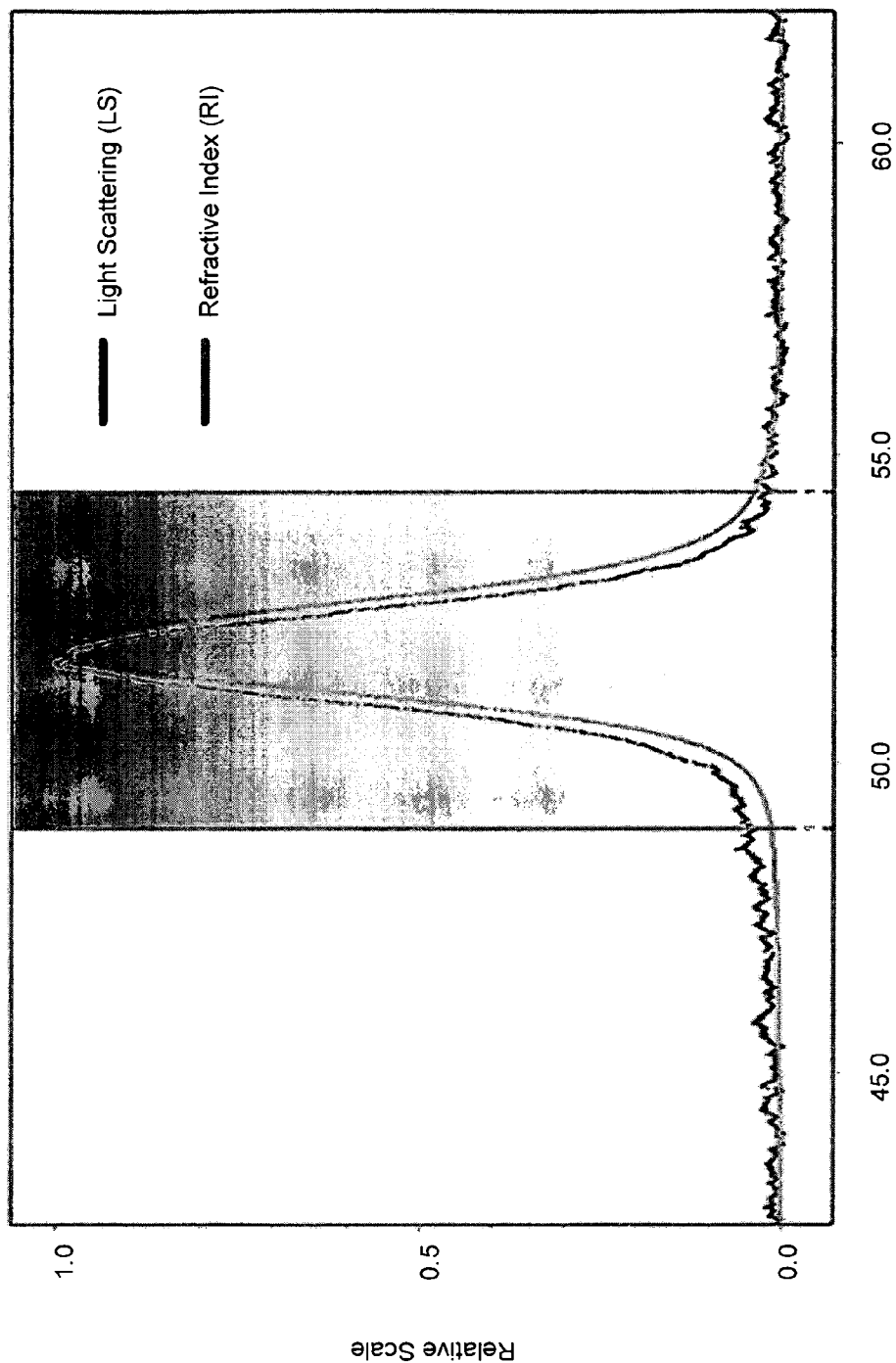
FIG. 1(b) is a GPC of PIB-$CH_2$—$CH$=$CH_2$.

FIG. 1(*a*) is a plot illustrating a $^1$H NMR spectrum of allyl-terminated PIB. The resonances observed at 5.02 and 5.88 ppm are due to the methine (—CH=) and methylene (=CH$_2$) protons, respectively. FIG. 1(*b*) is a plot illustrating the gel permeation chromatography (GPC) trace of allyl-terminated PIB. The number average molecular weight (M$_n$) is 4950 grams/mole, and the M$_w$/M$_n$=1.063. The intrinsic viscosity of the polymer is 8.2 mL/g.

Reaction Scheme 1

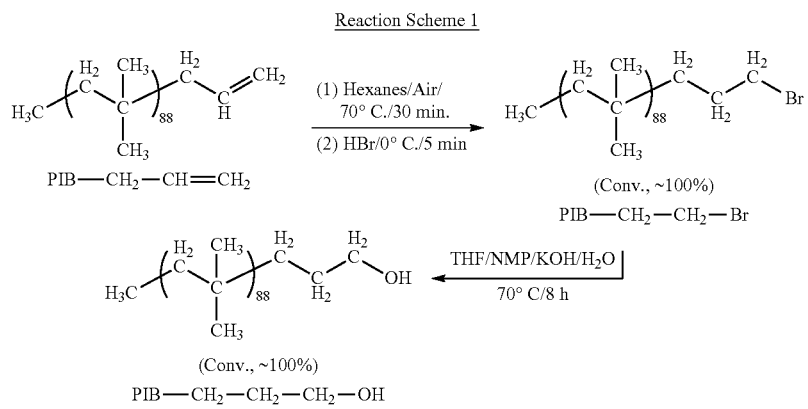

Synthesis of Primary Bromo-Terminated Polyisobutylene (PIB-$(CH_2)_3$—Br)

Synthesis of a primary bromo-terminated polyisobutylene is carried out according to Reaction Scheme 1 shown above.

Thirty (30) grams of allyl-terminated PIB ($M_n$=4950 grams/mole and $M_w/M_n$=1.063) in heptane (100 mL/68 grams) is placed in a 250 mL 3-necked round bottom flask fitted with a condenser, a gas inlet tube and a magnetic stirrer bar. The system is refluxed at approximately 70° C. and air is bubbled through the solution for 30 minutes. Thereafter, the system is cooled to 0° C., and HBr gas is bubbled into the solution for 5 minutes. Sodium hydrogen carbonate is added to neutralize the mixture, and the system is washed with water three times. The organic layer is separated, washed three times with distilled water, and dried over $MgSO_4$, and the hexanes are removed by a rotovap. The product, PIB-$(CH_2)_3$—Br, is dried in vacuum at 50° C. for 12 hours. The yield is 29 grams (97%). According to $^1$H NMR spectroscopy, the conversion is 100%.

Figure 2:
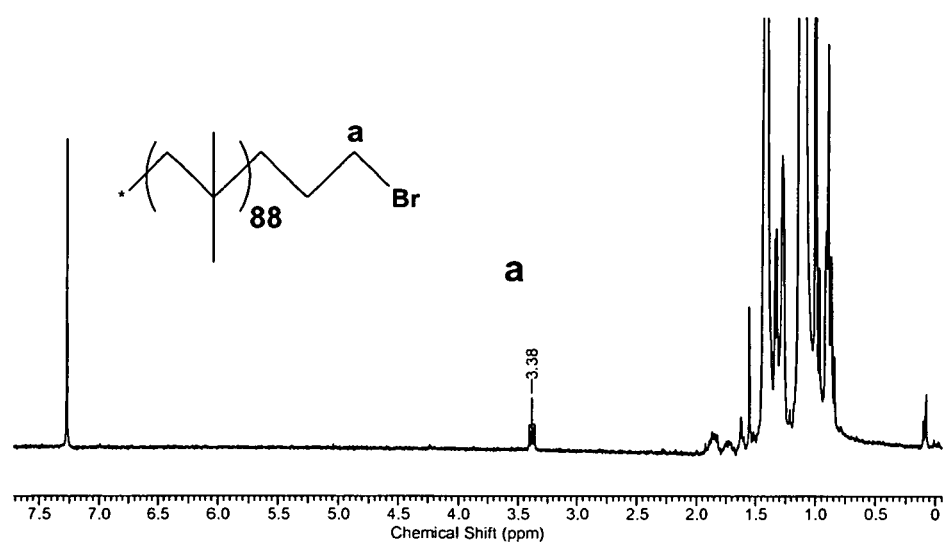
FIG. 2 is a $^1$H NMR spectrum of PIB-$(CH_2)_3$—Br.

FIG. 2 is a plot illustrating a $^1$H NMR spectrum of PIB-$(CH_2)_3$—Br. The peak observed at 3.38 ppm is characteristic of methylene protons adjacent to the bromide (—$CH_2$—Br).

The same procedure is also employed to convert Glissopal® 2300 to a primary bromide terminated derivative.

Synthesis of Primary Hydroxy Terminated Polyisobutylene (PIB-$(CH_2)_3$—OH)

Synthesis of a primary alcohol-terminated polyisobutylene is carried out according to Reaction Scheme 1 shown above.

Fourteen (14) grams PIB-$(CH_2)_3$—Br ($M_n$=5160 grams/mole and $M_w/M_n$=1.065) is dissolved in 60 mL THF and 31 grams N-methyl-2-pyrrolidone (NMP) is added to increase the polarity of the medium. To this solution is added 2.4 grams of potassium hydroxide dissolved in 3 mL water, and the mixture is refluxed at 70° C. for 24 hours. After completion, the reaction mixture is diluted by addition of 50 mL hexane and is washed 3 times with excess water. Next, the organic layer is separated, is washed three times with distilled water and then is dried over $MgSO_4$. Next, the hexane is removed by a rotovap. The resulting polymer is dried under vacuum at 50° C. for 12 hours. According to $^1$H NMR analysis, the conversion of the bromo-intermediate to PIB-$(CH_2)_3$—OH is 100% and the yield is 13.5 grams (96%).

Figure 3:
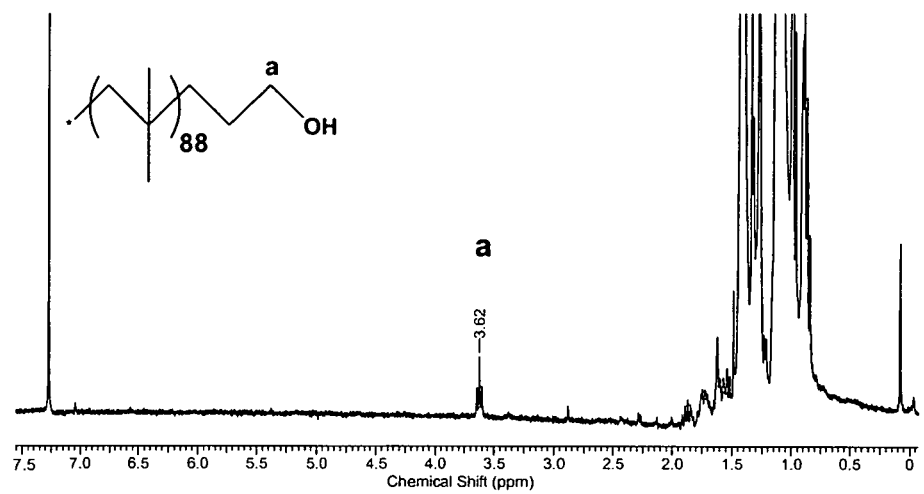
FIG. 3 is a $^1$H NMR spectrum of PIB-$(CH_2)_3$—OH.

FIG. 3 is a plot illustrating a $^1$H NMR spectrum of PIB-$(CH_2)_3$—OH. The characteristic proton resonance of a methylene group adjacent to hydroxyl group (—$CH_2$—OH) appears at approximately 3.62 ppm. The disappearance of the resonance at 3.38 ppm indicates the conversion of the bromide to the hydroxyl group. These results are indicative of quantitative substitution.

One Pot Synthesis of (PIB-$(CH_2)_3$—OH)

After completion of the synthesis of PIB-$CH_2$—CH=$CH_2$ as described above, a $CH_3Cl$ diluent is evaporated and the product is allowed to dissolve in the remaining hexanes. The solution is heated to reflux at approximately 70° C. and air is bubbled through the solution for 30 minutes. Next, the charge is cooled to 0° C. and HBr gas is bubbled into the solution for 5 minutes. The hexanes are removed by rotovap, and 80 mL THF and 40 mL NMP are added to increase the polarity of the medium. To this solution are added 5 grams KOH dissolved in 3 mL water. Next, the mixture is refluxed at 70° C. for 24 hours. The charge is diluted with 50 mL hexanes, washed twice with excess water (2×300 mL), and the organic layer is separated. Next, the solution is dried over $MgSO_4$, the hexanes are removed by a rotovap, and the resulting polymer is dried under vacuum. The yield is 33 grams (97%). According to $^1$H NMR analysis, the conversion of the bromo-intermediate to PIB-$(CH_2)_3$—OH is approximately 100%.

One example of a one pot synthesis is shown in the Reaction Scheme below.

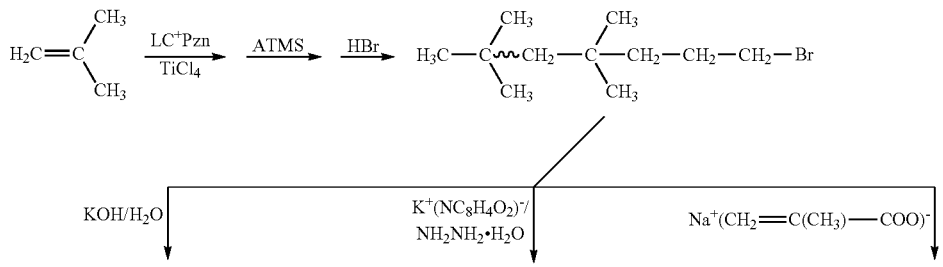

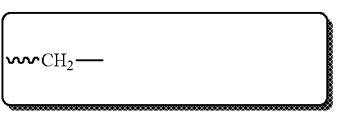 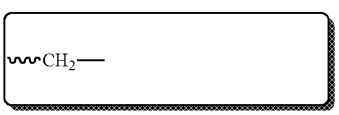 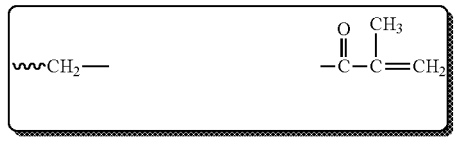

Synthesis of Primary Hydroxyl-Terminated Glissopal® 2300

Five grams hydrobrominated Glissopal® 2300 (see above) are dissolved in 20 mL THF and 10 mL NMP are added to increase the polarity of the medium. Then 1 gram of tetrabutylammonium hydrogen sulfate and 1 gram of potassium benzoate are added. The mixture is then refluxed at 70° C. for 12 hours. Next, 0.85 grams KOH dissolved in 1 mL water is added, the charge is refluxed for 12 hours, diluted with 20 mL hexanes and washed 3 times with water (3×300 mL). The organic layer is separated, washed three times with distilled water, dried over $MgSO_4$, the hexanes are removed by a rotovap, and the resulting polymer is dried under vacuum at 50° C. for 12 hours. The yield is 4.8 grams (96%). According to $^1$H NMR spectroscopy (FIG. 4), the conversion is 100%.

Synthesis of Primary Hydroxyl-Terminated Glissopal® 2300 by Phase Transfer Catalysis To 5 grams of hydrobrominated Glissopal® 2300 (see above) dissolved in 10 mL toluene is added 0.55 grams tetrabutylamonium benzoate. The mixture is heated at 80° C. for 2 hours. Then 0.85 grams KOH dissolved in 0.5 mL water and 0.4 grams 18-crown-6 are added. The charge is washed 2 times with water (2×300 mL), the organic layer separated and then washed three times with distilled water, and dried over $MgSO_4$. The toluene is removed by a rotovap, and the resulting polymer is dried under vacuum at 50° C. for 12 hours. The yield is 4.8 grams. According to $^1$H NMR analysis, the conversion is approximately 100%.

Characterization:

NMR spectroscopy is carried out by Varian 300 and 500 MHz spectrometers using $CDCl_3$ as solvent. Gel permeation chromatography (GPC) eluograms are obtained with a Waters GPC instrument equipped with a series of six Waters Styragel-HR columns (106, 105, 104, 103, 101 Angstrom pore sizes), a refractive index detector (Optilab, Wyatt Technology), a dual ultraviolet absorbance detector (model 2487, Waters), a laser light scattering detector (Mimidawn, Wyatt Technology), and a viscometer (Viscostar, Wyatt Technology). The samples are dissolved in THF and the flow rate is 1 mL THF/minute.

Results:

It has been found that the substitution of the bromine in PIB-$(CH_2)_3$—Br to PIB—$(CH_2)_3$—OH by KOH/$H_2O$ is incomplete in THF and that undesired elimination to the olefin occurred. To obtain quantitative substitution to the alcohol-terminated product discussed herein various experimental conditions are investigated.

Effect of the Reaction Conditions on the Formation of PIB-$(CH_2)_2$—OH

The effects of reaction conditions, such as N-methyl-2-pyrrolidone (NMP), KOH, and $H_2O$ concentrations, and time of the conversion to PIB-$(CH_2)_3$—OH are detailed below.

The Effect of NMP Concentration on Conversion to PIB-$(CH_2)_3$—OH

Figure 5:
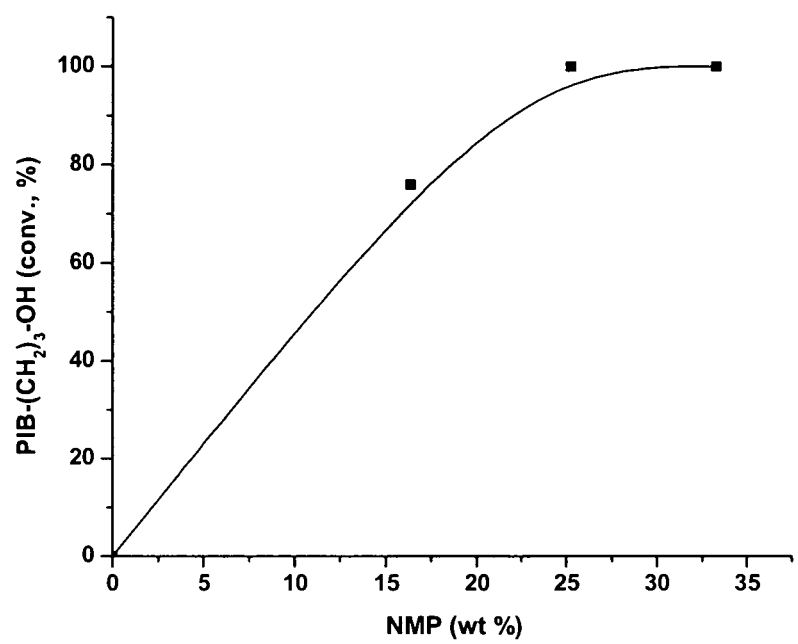
FIG. 5 is a plot of NMP (weight percent) versus conversion to PIB-$(CH_2)_3$—OH.

The nucleophilic substitution of the —Br to the target —OH end group requires the presence of a polar solvent; however, PIB-$(CH_2)_3$—Br is insoluble in polar media. Thus, the present invention involves the development of reaction conditions for the required substitution. While not wishing to be bound to any particular set of factors the following two requirements are important to determining the reaction conditions necessary to carry out the afore-mentioned nucleophilic substitution of the —Br to the target —OH end group. First, the solubility of the non-polar PIB-$(CH_2)_3$—Br substrate and the presence of a polar medium for the substitution are investigated. It is found that various polar solvents, i.e., dimethyl sulfoxide, acetone, etc., when added to the reaction medium result in the precipitation of PIB-$(CH_2)_3$—Br. In methylene chloride and chloroform the substitution reaction is very slow and incomplete. Alternatively, in another instance, 25 weight percent NMP, when added to the reaction medium, does not precipitate the PIB-$(CH_2)_3$—Br and leads to 100% conversion to PIB-$(CH_2)_3$—OH. The results of a series of representative experiments are shown in Table 1 and FIG. 5. Table 1 details the effect of NMP concentration on conversion to PIB-$(CH_2)_3$—OH.

TABLE 1

| Example | NMP (wt %) | PIB—$(CH_2)_3$—OH (conversion percentage) |
|---|---|---|
| 1 | 0 | 0 |
| 2 | 16.35 | 76 |
| 3 | 25.26 | ~100 |
| 4 | 33.30 | ~100 |

Reaction Conditions for the Above Examples:

PIB-$(CH_2)_3$—Br=1 gram=3.27 weight percent; THF=20 mL=65 weight percent; KOH=1 gram=3.27 weight percent; $H_2O$=1 mL=3.27 weight percent; temperature=80° C.; time=24 hours.

The Effect of the Amount of $H_2O$/KOH on Conversion to PIB-$(CH_2)_3$—OH:

Experiments are carried out to elucidate the role of water and KOH on the conversion to PIB-$(CH_2)_3$—OH. KOH in the absence of water is insoluble in THF and the presence of solid KOH in the charge did not give quantitative conversion to PIB-$(CH_2)_3$—OH, rather it leads to partial HBr elimination, and produces highly undesirable (olefinic) end groups. In the course of this experimentation it is discovered that KOH in the presence of small concentrations of water leads to quantitative conversions to PIB-$(CH_2)_3$—OH. The results of a series of representative experiments are shown in Table 2. Table 2 details the effect of $H_2O$ on conversion to PIB-$(CH_2)_3$—OH.

TABLE 2

| Example | $H_2O$ (wt %) | PIB—$(CH_2)_3$—OH (conversion percentage) |
|---|---|---|
| 5* | 0 | 94 |
| 6 | 3.23 | 100 |
| 7 | 11.45 | 100 |

Reaction Conditions for the Above Examples:
PIB-$(CH_2)_3$—Br=1 gram=3.23 weight percent; THF=20 mL=17.78 grams=57.48 weight percent; NMP=10 mL=10.3 grams=33.30 weight percent; KOH=0.85 grams=2.75 weight percent; temperature=80° C.; time=24 hours.

$^1$H NMR spectroscopy showed the formation of 2 mole percent unsaturated (olefinic) end groups.

Figure 6:
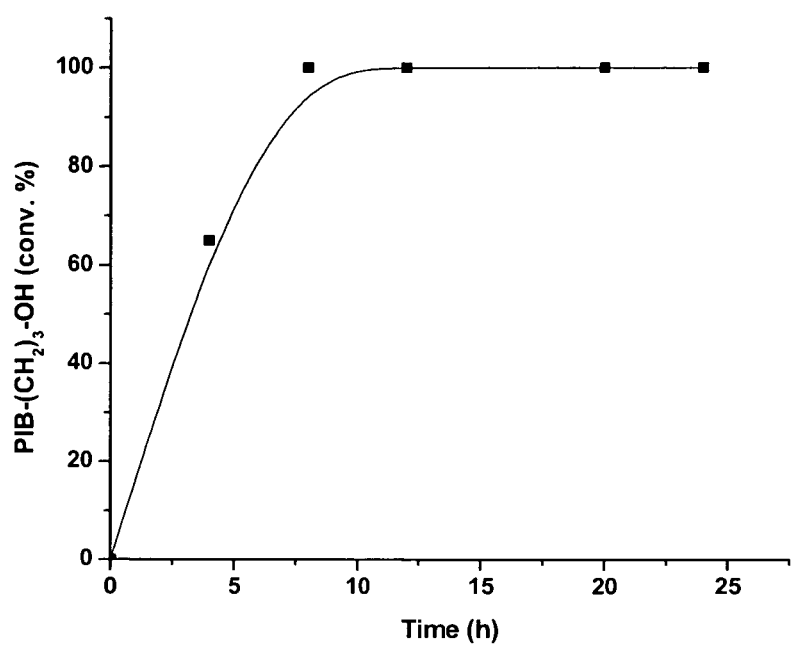
FIG. 6 is a plot of time (hours) versus conversion to PIB-$(CH_2)_3$—OH.

The Effect of Time on Conversion to PIB-$(CH_2)_3$—OH:

A series of experiments are conducted to determine the effect of time on the conversion to PIB-$(CH_2)_3$—$OH_{conversion}$. The reaction conditions are as follows: PIB-$(CH_2)_3$—Br=1 gram=3.23 weight percent; THF=20 mL=17.78 grams=57.48 weight percent; NMP=10 mL=10.3 grams=33.30 weight percent; KOH=0.85 grams=2.75 weight percent; $H_2O$=1 gram=3.23 weight percent; temperature=80° C. Aliquots are withdrawn at 4, 8, 12, 20 and 24 hours and analyzed by $^1$H NMR spectroscopy. Table 3 and FIG. 6 detail the effect of time on the synthesis of PIB-$(CH_2)_3$—OH.

Per the above experiments, the conversion of PIB-$(CH_2)_3$—OH is quantitative by 8 hours.

TABLE 3

| Example | Time (hours) | PIB—$(CH_2)_3$—OH (conversion percentage) |
|---|---|---|
| 8 | 4 | 65 |
| 9 | 8 | 100 |
| 10 | 12 | 100 |
| 11 | 20 | 100 |
| 12 | 24 | 100 |

One-Pot Synthesis of PIB-$(CH_2)_3$—OH:

In the course of the above experiments it was discovered that PIB-$(CH_2)_3$—OH and PIB-$(CH_2)_3$-MA can be synthesized in one-pot starting with gaseous isobutylene. In this embodiment, all the synthesis steps (i.e., synthesis of allyl-, bromo- and hydroxyl-terminated PIB) can be accomplished in one-pot without separating the intermediates. While not wishing to be bound to any one theory, the key to this embodiment is that the by-products of the synthesis steps do not interfere with the chemical reactions leading to the target polymers PIB-$(CH_2)_3$—OH and PIB-$(CH_2)_3$-MA.

FIGS. 1(a), 2 and 3 show the $^1$H NMR spectra of the allyl-, primary bromide- and hydroxyl-terminated PIBs together with key assignments. In FIG. 1(a), the resonances observed at 5.02 and 5.88 ppm are due to the methine (—CH=) and methylene (=$CH_2$) protons, respectively. In FIG. 2 the resonance at 3.38 ppm is characteristic of methylene protons adjacent to the bromide (—$CH_2$—Br); and in FIG. 3 the characteristic proton resonance of a methylene group adjacent to hydroxyl group (—$CH_2$—OH) appears at approximately 3.62 ppm. The disappearance of the resonance at 3.38 ppm indicates the conversion of the bromide to the hydroxyl group. The spectra of FIGS. 1(a), 2 and 3 indicate quantitative hydrobromination, and quantitative substitution of the bromine terminus to the corresponding primary alcohol.

Primary Hydroxyl-Terminated Glissopal® 2300:

Glissopal® 2300 is a commercially available low molecular weight ($M_n$=2300 g/mol) PIB carrying approximately 82% —$CH_2C(CH_3)$=$CH_2$ termini at one end. This product is sold by BASF for a great variety of industrial applications (fuel additives, lubricant additives, industrial lubricants for two-stroke engines, adhesives, sealants, plastics, chewing gum base). It is of interest to investigate the conversion of Glissopal® that contains a $CH_3$-substituted vinyl end to the corresponding primary alcohol by the procedure disclosed herein. The balance of the end structures (approximately 18%) are mainly internal olefins, e.g., —CH=$C(CH_3)_2$. It is determined that under certain conditions the allyl group is quantitatively converted to the corresponding alcohol, and only approximately 70% of the —$CH_2C(CH_3)$=$CH_2$ end is converted to —$CH_2C(CH_3)$—$CH_2OH$, while the rest of the internal olefins remain unchanged. The conversion reducing effect of the terminal β-$CH_3$ group is unexpected but is not unprecedented.

Figure 4:
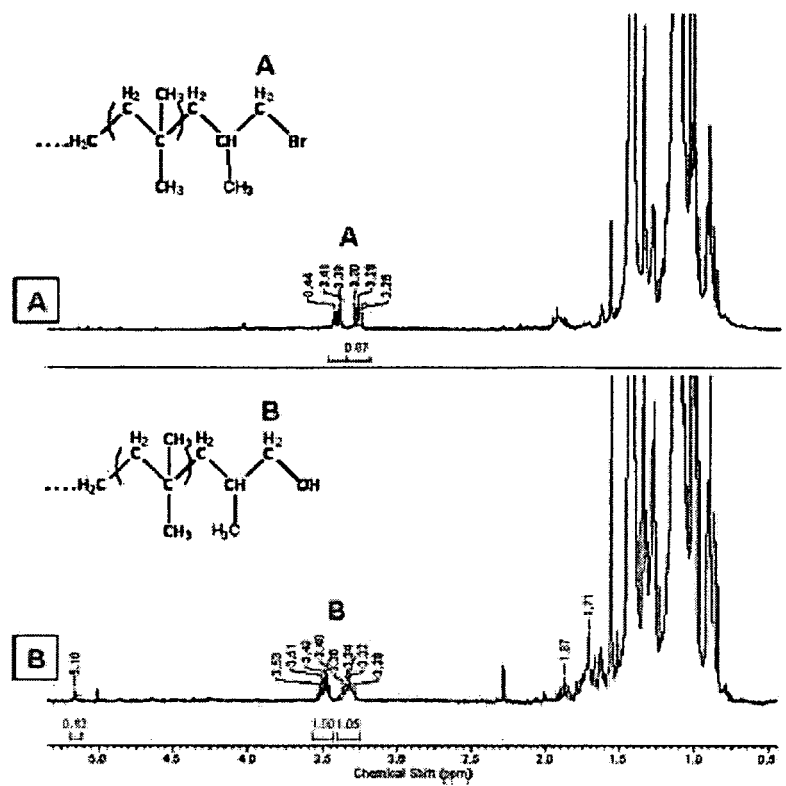
FIG. 4 is a $^1$H NMR spectrum of (A) bromo-terminated and (B) hydroxyl-terminated Glissopal® 2300.

Additional experimentation showed that the —$CH_2C(CH_3)$=$CH_2$ end group in Glissopal® 2300 can be quantitatively converted to alcohol by first converting it to the primary Br-terminated product via anti-Markovnikov HBr addition, converting the Br to the benzoate in the presence of a phase transfer catalyst in a 57/33 mixture of THF/NMP, followed by KOH/$H_2O$ hydrolysis. Quantitative conversion can also be obtained in the absence of polar solvent by the use of tetrabutyl ammonium benzoate phase transfer catalyst in toluene. Reaction Scheme 2 summarizes the transformations and FIG. 4 shows the $^1$H NMR spectra of the intermediate and the target alcohol.

Reaction Scheme 2

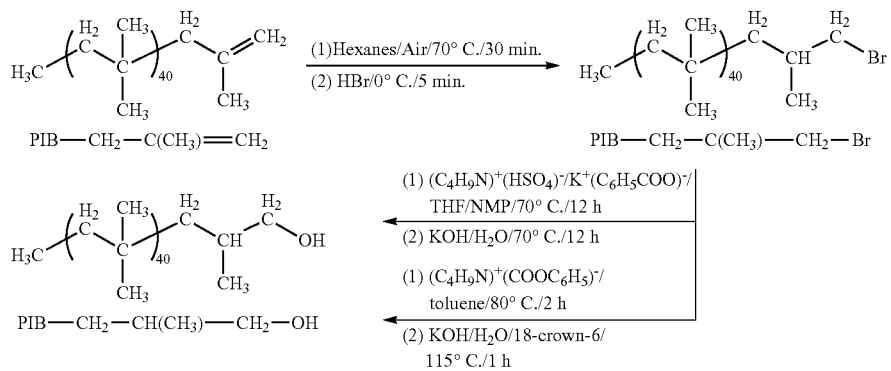

Synthesis of Polyisobutylene Methacrylate Macromolecules (PIB-(CH$_2$)$_3$-MA Synthesis of a primary methacrylate-terminated polyisobutylene is carried out according to Reaction Scheme 3 shown below.

Reaction Scheme 3

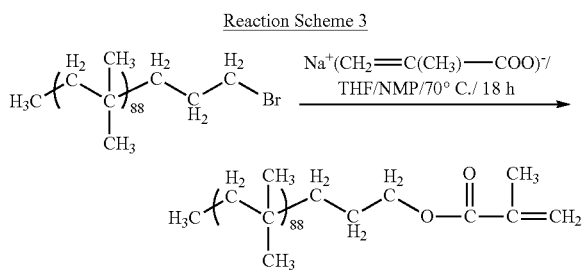

Figure 7:
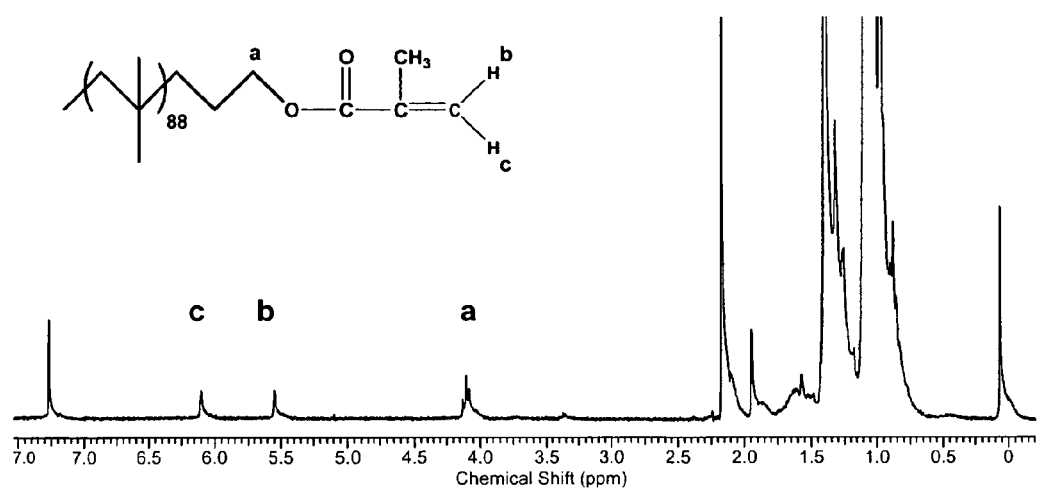
FIG. 7 is a $^1$H NMR spectrum of PIB-$(CH_2)_3$—OCOC$(CH_3)$=$CH_2$.

To 1.0 grams of PIB-(CH$_2$)$_3$—Br (M$_n$=5160 grams/mole and M$_w$/M$_n$=1.065) dissolved in 20 mL of THF is added 10.0 mL NMP to increase the polarity of the medium. To this solution is added 1 gram of sodium methacrylate, and the mixture is refluxed at 70° C. for 18 hours. The charge is diluted by the addition of 50 mL hexanes and washed 3 times with excess water. The organic layer is separated, washed three times with distilled water and dried over MgSO$_4$. The hexanes are removed by a rotovap and the resulting polymer is dried under vacuum at 50° C. for 12 hours. The yield of PIB-(CH$_2$)$_3$-MA is 0.95 grams (95%). According to $^1$H NMR analysis shown in FIG. 7, the conversion to PIB-(CH$_2$)$_3$—OCOC(CH$_3$)=CH$_2$ is 100%.

Given the above, the primary Br-terminated PIB can be quantitatively converted to methacrylate-terminated PIB by NaMA in the presence of a mixture of polar solvents. In one embodiment, one such suitable mixture is 57/33 THF/NMP.

Synthesis of Amine-Terminated Polyisobutylene (PIB-(CH$_2$)$_3$—NH$_2$)

In this embodiment, the synthesis of PIB-(CH$_2$)$_3$—NH$_2$ involves two steps: (a) substitution of the terminal primary bromine to phthalimide-terminated polyisobutylene (PIB-(CH$_2$)$_3$-phthalimide; and (b) hydrazinolysis of the phthalimide terminated polyisobutylene to primary amine-terminated polyisobutylene (PIB-(CH$_2$)$_3$—$^{NH}$$_2$).

Synthesis of Phthalimide-Terminated Polyisobutylene (PIB-(CH$_2$)$_3$-Phthalimide)

Synthesis of a phthalimide-terminated polyisobutylene (PIB-(CH$_2$)$_3$-phthalimide) is carried out according to the reaction scheme shown below:

Reaction Scheme 4

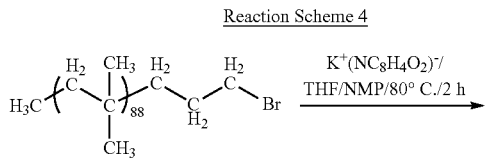

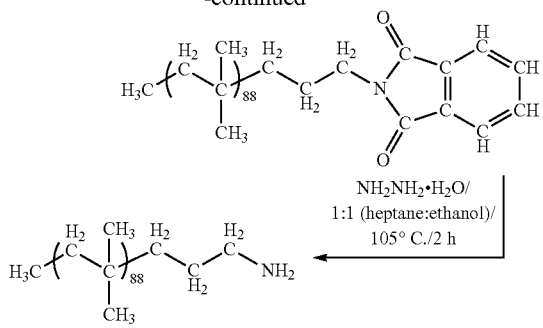

To 1.0 gram of PIB-(CH$_2$)$_3$—Br (M$_n$=5160 grams/mole and M$_w$/M$_n$=1.06) dissolved in 20 mL THF is added 10 mL of NMP to increase the polarity of the medium. To this solution is added 1.0 gram of potassium phthalimide and the mixture is refluxed at 70° C. for 4 hours. The reaction mixture is diluted by the addition of 50 mL hexanes and washed 3 times with excess water. The organic layer is separated, washed three times with distilled water and dried over MgSO$_4$. The hexanes are removed by a rotovap, and the resulting polymer is dried under vacuum at 50° C. for 12 hours. The yield of PIB-(CH$_2$)$_3$-phthalimide is 0.97 grams. According to $^1$H NMR analysis of FIG. 8, the conversion of the bromo-intermediate to PIB-(CH$_2$)$_3$-phthalimide is 100%.

Figure 8:
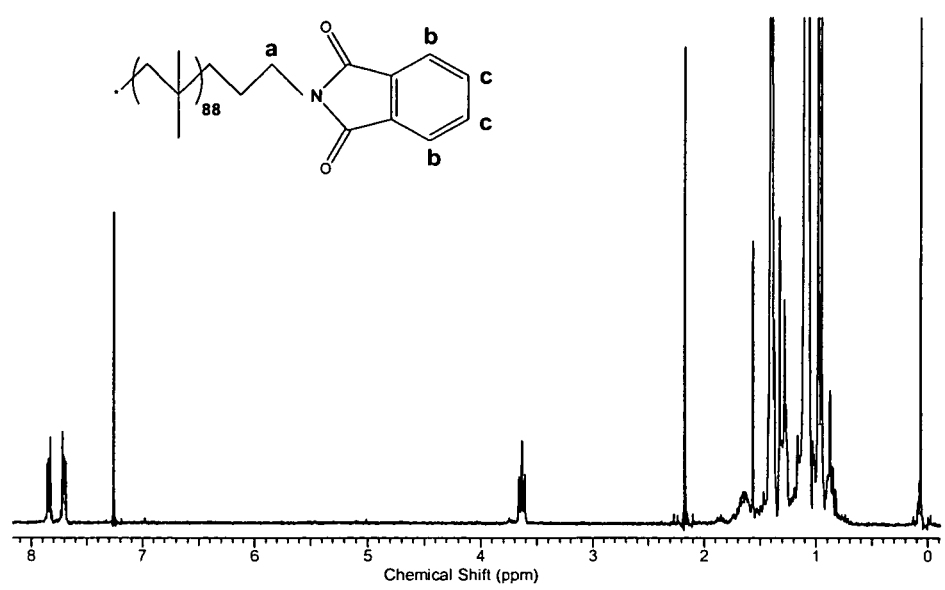
FIG. 8 is a $^1$H NMR spectrum of PIB-$(CH_2)_3$-phthalimide.

FIG. 8 is a plot illustrating a $^1$H NMR spectrum of PIB-(CH$_2$)$_3$-phthalimide. The resonance at 3.65 pm is characteristic of methylene protons adjacent to the phthalimide group. The disappearance of the resonance at 3.38 ppm indicates the conversion of the bromide to a phthalimide group. These results indicate quantitative substitution.

Synthesis of Primary Amine-Terminated Polyisobutylene PIB-(CH$_2$)$_3$—NH$_2$)

Synthesis of an amine-terminated polyisobutylene (PIB-(CH$_2$)$_3$—NH$_2$) is carried out according to Reaction Scheme 4 shown above.

To 1.0 gram of PIB-(CH$_2$)$_3$-phthalimide dissolved in a mixture of 20 mL heptane and 20 mL of ethanol is added 3 grams of hydrazine hydrate. This mixture is then refluxed at 105° C. for 5 hours. Then the charge is diluted with 50 mL hexanes and washed 3 times with excess water. The organic layer is separated, washed three times with distilled water and dried over MgSO$_4$. The hexanes are removed by a rotovap and the polymer is dried under vacuum at 50° C. for 12 hours. The yield of PIB-(CH$_2$)$_3$—NH$_2$ is 0.96 grams.

Figure 9:
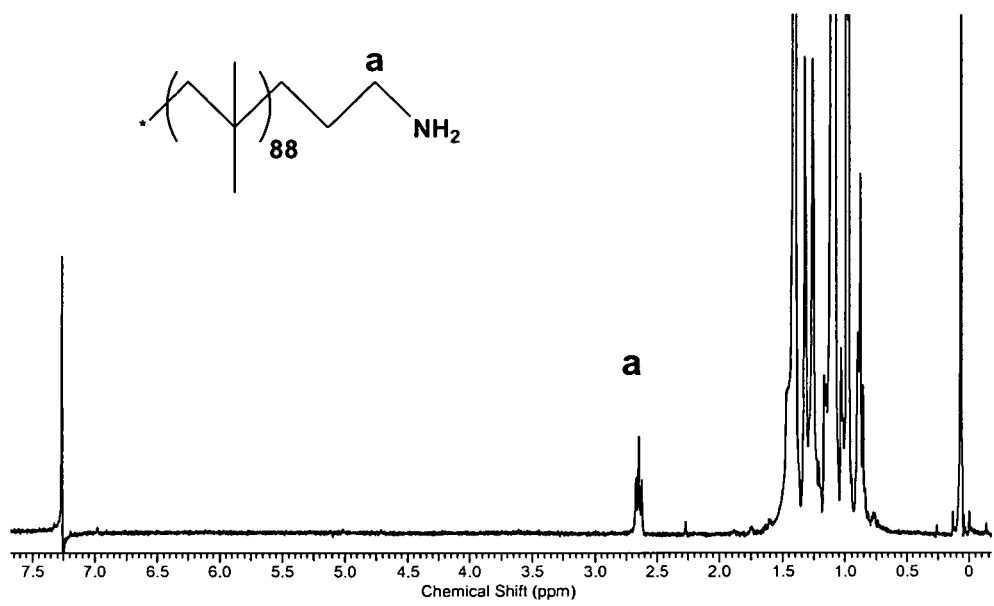
FIG. 9 is a $^1$H NMR spectrum of PIB-$(CH_2)_3$—$NH_2$.

FIG. 9 is a plot illustrating a $^1$H NMR spectrum of PIB-(CH$_2$)$_3$—NH$_2$. According to $^1$H NMR analysis, the conversion of the phthalimide-intermediate to PIB-(CH$_2$)$_3$—NH$_2$ is quantitative. The resonance at 2.66 ppm is characteristic of methylene protons adjacent to the amine group (—CH$_2$—NH$_2$). The disappearance of the resonance at 3.65 ppm indicates the essentially quantitative conversion of the phthalimide group to an amine group.

PIB-(CH$_2$)$_3$—BR is converted to the corresponding phthalimide which, upon hydrazinolysis yields PIB-(CH$_2$)$_3$—NH$_2$. Reaction Scheme 4 summarizes the transformations and FIGS. 8 and 9 show the $^1$H NMR spectra of the PIB-phthalimide and target amine. As is noted above, the resonance at 3.65 pm is characteristic of methylene protons adjacent to the phthalimide group. The disappearance of the resonance at 3.38 ppm indicates the conversion of the bromide to the phthalimide group. The conversion of the phthalimide intermediate to PIB-$(CH_2)_3$—$NH_2$ is also quantitative. The resonance at 2.66 ppm is characteristic of methylene protons adjacent to the amine group (—$CH_2$—$NH_2$). The disappearance of the resonance at 3.65 ppm indicates the essentially quantitative conversion of the phthalimide to the amine group.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A method for producing a primary alcohol-terminated polyisobutylene compound comprising the steps of:
    (A) providing an alkenyl-terminated polyisobutylene having exactly one alkenyl terminus, wherein the one alkenyl terminus is formed from a straight $C_3$ to $C_{12}$ alkenyl group having a double bond present at the end of the alkenyl group;
    (B) subjecting the alkenyl-terminated polyisobutylene to a bromination reaction to form a primary bromine-terminated polyisobutylene compound having one primary bromine terminus;
    (C) converting the primary bromine-terminated polyisobutylene compound to a primary alcohol-terminated polyisobutylene via a base reaction, the primary alcohol-terminated polyisobutylene having exactly one primary alcohol terminus; and
    (D) recovering the primary alcohol-terminated polyisobutylene.

2. The method of claim 1, wherein the one alkenyl terminus is —$CH_2$—$CH$=$CH_2$.

3. The method of claim 1, wherein the bromination reaction of Step (B) utilizes HBr.

4. The method of claim 1, wherein the primary alcohol-terminated polyisobutylene compound is a linear molecule.

* * * * *